United States Patent
Lee et al.

(10) Patent No.: US 10,404,968 B2
(45) Date of Patent: Sep. 3, 2019

(54) METHOD AND SYSTEM FOR DETERMINING OPTIMAL EXPOSURE TIME AND NUMBER OF EXPOSURES IN STRUCTURED LIGHT-BASED 3D CAMERA

(71) Applicant: RESEARCH & BUSINESS FOUNDATION SUNGKYUNKWAN UNIVERSITY, Suwon-si (KR)

(72) Inventors: Suk-han Lee, Yongin-si (KR); Yun-su Choi, Seongnam-si (KR); In-sub Shin, Bucheon-si (KR)

( * ) Notice: Subject to any disclaimer, the term of this patent is extended or adjusted under 35 U.S.C. 154(b) by 197 days.

(21) Appl. No.: 15/334,314

(22) Filed: Oct. 26, 2016

(65) Prior Publication Data

US 2017/0118456 A1 Apr. 27, 2017

(30) Foreign Application Priority Data

Oct. 27, 2015 (KR) ........................ 10-2015-0149156

(51) Int. Cl.
*H04N 13/254* (2018.01)
*H04N 5/235* (2006.01)

(52) U.S. Cl.
CPC ......... *H04N 13/254* (2018.05); *H04N 5/2351* (2013.01); *H04N 5/2353* (2013.01); *H04N 5/2356* (2013.01)

(58) Field of Classification Search
CPC .................................................... H04N 13/254
USPC ............................................................ 348/46
See application file for complete search history.

(56) References Cited

U.S. PATENT DOCUMENTS

| 2015/0116582 | A1* | 4/2015 | Yoshikawa | H04N 5/2353 348/362 |
| 2015/0244916 | A1* | 8/2015 | Kang | H04N 5/2353 348/222.1 |

* cited by examiner

*Primary Examiner* — Yulin Sun
(74) *Attorney, Agent, or Firm* — Jongkook Park

(57) ABSTRACT

Disclosed is a method for determining the optimal exposure time and the number of exposures in a structured light-based 3D camera system. The method includes capturing a reference image onto which first and second patterns are projected, calculating a slope related to brightness and an exposure time for a pixel of the reference image and categorizing a state of the slope, creating an upper loss pixel distribution chart and an accumulation pixel distribution chart by calculating the number of upper loss pixels and the number of accumulation pixels for the exposure time of the structured light-based 3D camera system, and determining the optimal exposure time and the number of exposures of the structured light-based 3D camera system using the upper loss pixel distribution chart and the accumulation pixel distribution chart.

34 Claims, 13 Drawing Sheets

| EXPOSURE TIME | 1ms | 4ms | 7ms | 10ms | 13ms | 16ms | 19ms | 22ms | 25ms |
|---|---|---|---|---|---|---|---|---|---|
| NUMBER OF RECONSTRUCTED PIXELS | 38202 | 214782 | 224137 | 231291 | 234147 | 234809 | 235980 | 236732 | 237193 |
| EXPOSURE TIME | 28ms | 31ms | 34ms | 37ms | 40ms | 43ms | 46ms | 49ms | 52ms |
| NUMBER OF RECONSTRUCTED PIXELS | 237536 | 232374 | 208753 | 200052 | 184640 | 152976 | 130346 | 122746 | 121947 |
| EXPOSURE TIME | 55ms | 58ms | 61ms | 64ms | 67ms | 70ms | 73ms | 76ms | 79ms |
| NUMBER OF RECONSTRUCTED PIXELS | 120012 | 120162 | 119689 | 120110 | 120705 | 121069 | 121574 | 122125 | 122140 |
| EXPOSURE TIME | 82ms | 85ms | 88ms | 91ms | 94ms | 97ms | 100ms | | |
| NUMBER OF RECONSTRUCTED PIXELS | 122587 | 123143 | 123308 | 123442 | 123698 | 124266 | 124029 | | |

FIG. 8

METHOD AND SYSTEM FOR DETERMINING OPTIMAL EXPOSURE TIME AND NUMBER OF EXPOSURES IN STRUCTURED LIGHT-BASED 3D CAMERA

CROSS-REFERENCE TO RELATED APPLICATIONS

The present application claims priority under 35 U.S.C. § 119 to Korean Patent Application No. 10-2015-0149156 (Filed on Oct. 27, 2015), which is hereby incorporated by reference in its entirety.

BACKGROUND OF THE INVENTION

Field of the Invention

The present invention relates to a method for determining an exposure of a structured light-based 3D camera.

Description of the Related Art

Generally, technologies for reconstructing a 3D image of an object using one or more cameras may be largely classified as either being active or passive techniques. Examples of active techniques include laser triangulation and structured light. An example of a passive technique is stereovision. Active techniques are typically preferred for research or industrial purposes because they may achieve higher precision scanning than passive techniques.

A 3D camera system for use with structured light can be considered as a modification of a stereo camera system. In particular, unlike a stereo camera system, in which two identical cameras are used, a 3D camera system used for structured light is configured such that one camera is replaced by a projection device such, as a beam projector. Accordingly, in a 3D camera system used for structured light scanning, one or more patterns are projected onto an object using a projection device, an image of the object onto which the pattern is projected is captured using an image-capturing device, such as a camera, and 3D information about the object is acquired by analyzing the captured image.

In other words, because a stereo camera system passively uses features extracted from an image but a structured light-based camera system actively projects one or more patterns onto an object using a projection device and uses the projected pattern to distinguish features of the object, a structured light-based camera system has a fast processing speed and high spatial resolution. Thanks to these advantages, the structured light-based camera system is widely used in various fields, such as object modeling and recognition, 3D measurement, industrial inspection, reverse engineering, and the like.

However, structured light-based camera systems have the following general problems.

Generally, in the real world, objects have various reflection coefficients. Accordingly, when patterns are projected from a projection device onto an object having a low reflection coefficient (for example, a black ball), it is difficult to correctly acquire the projected patterns using a capturing device. Conversely, when patterns are projected onto an object having a high reflection coefficient (for example, a white ball having a glossy surface), because the gloss causes saturation of patterns (seen as blurred patterns) in the image acquired using a capturing device, it is difficult to acquire accurate patterns. Also, light conditions of a real environment may affect the image acquisition of patterns. Additionally, it may be difficult to acquire accurate patterns in a real environment that is too bright or too dark.

SUMMARY OF THE INVENTION

In order to solve the above problems, it is necessary to adjust the exposure of a camera by controlling the aperture of a camera depending on the environment.

With the introduction of 3D printers, there is an increase in the use of structured light-based cameras by laypersons. However, because it is not easy to adjust the parameters of such cameras to adapt in real time to changing environmental conditions, it is difficult for laypersons, who are not experts, to use such cameras. Also, with the development of structured light-based 3D cameras, there is an increase in the demand for acquiring accurate 3D data in industrial fields. Here, in order to construct an automated system for use in industry, a structured light-based camera is fixed to an industrial robot, whereby accurate 3D data may be acquired. However, because most objects to be recognized in industrial fields are made of metal, which has a low reflection coefficient, the construction of an automated system for use in industrial fields is impeded.

Therefore, it is necessary to automatically adjust the number of exposures and the exposure time of a 3D camera depending on the environment.

The present invention provides a method and system for determining the optimal exposure time and the number of exposures by which, when an object having a low reflection coefficient and an object having a high reflection coefficient are mixed together in an environment, the optimal exposure time of a structured light-based 3D camera is determined, and by which, when it is difficult to reconstruct 3D data using only a single exposure, two exposure times having the optimal lengths and the optimal number of the exposures are determined. An object of the present invention is to improve reliability and to increase the extent to which 3D data may be reconstructed using such a method and system.

According to one aspect of the present invention, there is provided a method for determining an optimal exposure time and a number of exposures in a structured light-based 3D camera system. The method includes capturing a reference image onto which a first pattern and a second pattern are projected, calculating a slope related to brightness and an exposure time for a pixel of the reference image and categorizing a state of the slope, creating an upper loss pixel distribution chart and an accumulation pixel distribution chart by calculating a number of upper loss pixels and a number of accumulation pixels for an exposure time of the structured light-based 3D camera system, and determining the optimal exposure time and the number of exposures of the structured light-based 3D camera system using the upper loss pixel distribution chart and the accumulation pixel distribution chart.

The first pattern and the second pattern may include at least one of an all-black pattern and an all-white pattern.

The capturing the reference image may include determining a first exposure time so as to prevent a brightness value of an object having a high reflection coefficient from being greater than 250, and determining a second exposure time so as to prevent a brightness value of an object having a low reflection coefficient from being less than 10.

The calculating the slope and categorizing the state of the slope may include defining a state of brightness depending on a brightness value of a pixel in the reference image that is captured with the first exposure time and the second exposure time.

The calculating the slope and categorizing the state of the slope may further include defining the state of brightness as a case in which the brightness value of the pixel in the reference image captured with the first exposure time and the second exposure time is less than 10, a case in which the brightness value of the pixel in the reference image captured with the first exposure time and the second exposure time is greater than 250, and a case in which the brightness value is not less than 10 and is not greater than 250.

The calculating the slope and categorizing the state of the slope may further include calculating the slope related to the brightness and the exposure time for each of the first pattern and the second pattern depending on the state of brightness, and categorizing the state of the slope.

The creating the upper loss pixel distribution chart and the accumulation pixel distribution chart may include excluding states in which the brightness value of the pixel is less than a predetermined threshold brightness value depending on the state of the slope for each of the first pattern and the second pattern when predicting a pixel to be reconstructed.

The determining the optimal exposure time and the number of exposures may include searching for an exposure time that first satisfies a predetermined first criterion in the accumulation pixel distribution chart, and determining whether a percentage of upper loss pixels at the found exposure time satisfies a predetermined second criterion.

The determining the optimal exposure time and the number of exposures may further include a first step in which, when the percentage of the upper loss pixels does not satisfy the predetermined second criterion, whether the corresponding exposure time is a maximum exposure time of the structured light-based 3D camera system is determined; a second step in which, when the corresponding exposure time is not the maximum exposure time of the structured light-based 3D camera system, the corresponding exposure time is increased by a predetermined amount; a third step in which whether the percentage of the upper loss pixels at the increased exposure time satisfies the predetermined second criterion is determined again; and repeating the first, second, and third steps until the percentage of the upper loss pixels satisfies the predetermined second criterion or until the corresponding exposure time becomes the maximum exposure time.

The determining the optimal exposure time and the number of exposures may further include setting the number of exposures to a single exposure when the percentage of the upper loss pixels satisfies the predetermined second criterion.

The determining the optimal exposure time and the number of exposures may further include, when the corresponding exposure time is the maximum exposure time of the structured light-based 3D camera system, setting the exposure time that first satisfies the predetermined first criterion in the accumulation pixel distribution chart as a long exposure time; and setting the exposure time at which the percentage of the upper loss pixels first satisfies the predetermined second criterion in the upper loss pixel distribution chart as a short exposure time.

According to another aspect of the present invention, there is provided a structured light-based 3D camera system. The system includes a projection unit for projecting a pattern onto a target object, a capturing unit for capturing an image that includes the pattern projected from the projection unit, and a processing unit for determining an optimal exposure time and a number of exposures using a reference image acquired by the capturing unit, wherein the processing unit includes an image acquisition unit for acquiring an image onto which a pattern is projected; a slope calculation and state categorization unit for calculating a slope related to brightness and an exposure time for a pixel of the reference image acquired from the image acquisition unit and for categorizing a state of the slope; a distribution chart creation unit for creating an upper loss pixel distribution chart and an accumulation pixel distribution chart by calculating a number of upper loss pixels and a number of accumulation pixels for the exposure time of the structured light-based 3D camera system; and an optimal exposure time and frequency determination unit for determining the optimal exposure time and the number of exposures of the structured light-based 3D camera system using the upper loss pixel distribution chart and the accumulation pixel distribution chart.

BRIEF DESCRIPTION OF THE DRAWINGS

The above and other objects, features and other advantages of the present invention will be more clearly understood from the following detailed description when taken in conjunction with the accompanying drawings, in which:

FIG. 8 is a table that shows an exposure time and the number of reconstructed pixels when the scene of FIG. 7 is captured using a structured light-based 3D camera system.

DETAILED DESCRIPTION OF THE INVENTION

Figure 1:
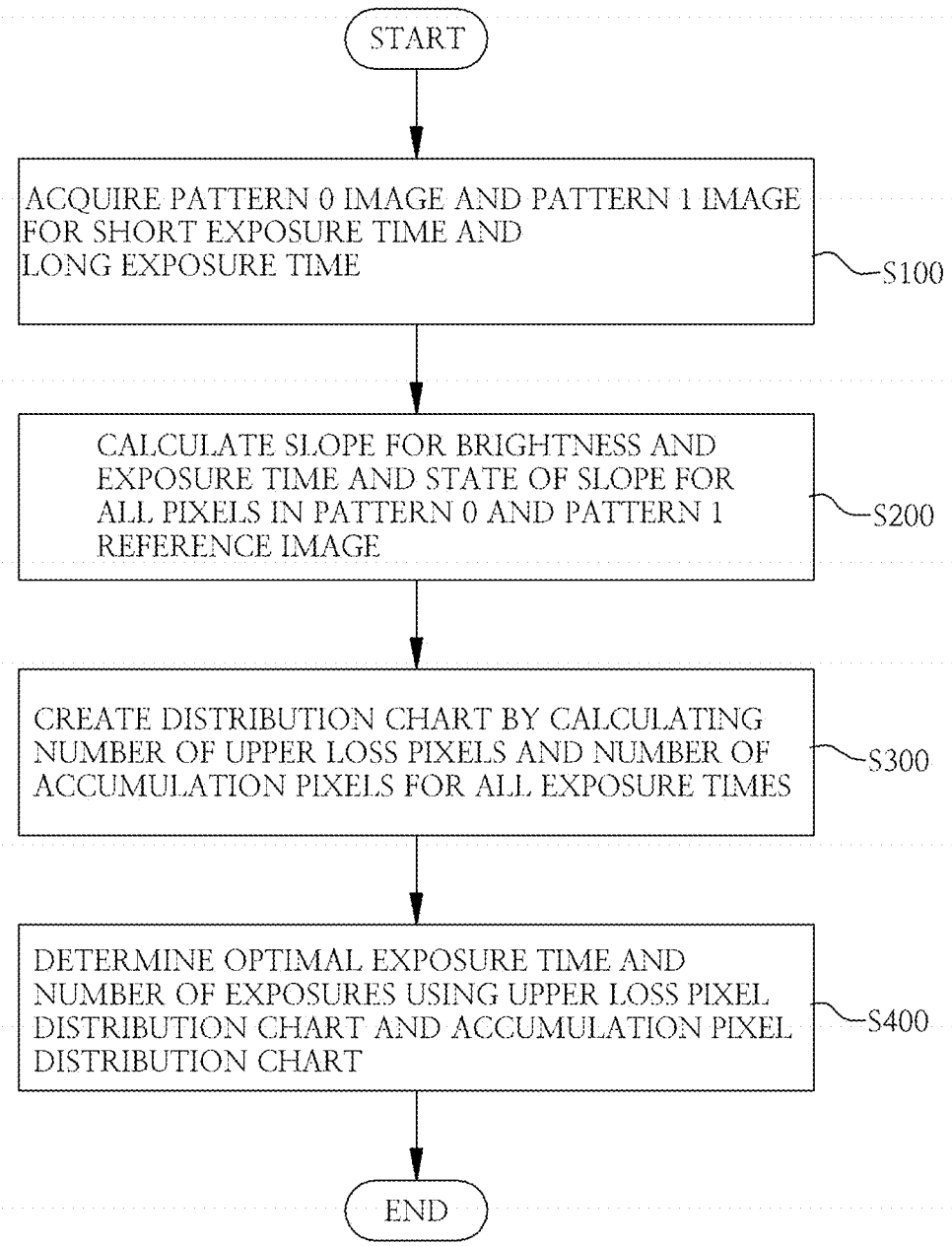
FIG. 1 is a flowchart of a method for determining the optimal exposure time.

The present invention relates to methods and apparatus for determining an optimal number of exposures and a duration thereof in a structured light-based 3D camera system and a structured light-based 3D camera system using such methods and apparatus.

The present invention may be variously changed, and may have various embodiments, and specific embodiments will be described in detail below with reference to the attached drawings. However, it should be understood that those embodiments are not intended to limit the present invention to specific disclosure forms and that they include all changes, equivalents or modifications included in the spirit and scope of the present invention.

In the present specification, a singular expression includes a plural expression unless a description to the contrary is specifically pointed out in context. In the present specification, it should be understood that terms such as "include" or "have" are merely intended to indicate that features, numbers, steps, operations, components, parts, or combinations thereof are present, and are not intended to exclude the possibility that one or more other features, numbers, steps, operations, components, parts, or combinations thereof will be present or added.

Hereinafter, embodiments of the present invention will be described in detail with reference to the accompanying drawings. In the following description of the present invention, the same reference numerals are used to designate the same or similar elements throughout the drawings, and repeated descriptions of the same components will be omitted.

In the present invention, an exposure of a structured light-based 3D camera means the amount of light that is introduced when an image is captured using the camera. Generally, the exposure of a camera is adjusted using an aperture and/or shutter speed of the camera. This specification describes a method and system for determining the optimal exposure (by adjusting the exposure time and/or the number of exposures) of a structured light-based 3D camera.

FIG. 1 is a flowchart of a method for determining the optimal exposure time. Referring to FIG. 1, the method for determining the optimal exposure of a structured light-based 3D camera includes capturing a reference image at step S100, calculating a slope and categorizing the state of the slope at step S200, creating a distribution chart at step S300, and determining the optimal exposure time and the number of exposures at step S400.

In the capturing the reference image at step S100, images of an object onto which pattern 0 and pattern 1 are projected, respectively, are captured. Here, pattern 0 means an all-black pattern (when a projection device is turned off), and pattern 1 means an all-white pattern. Here, in order to improve reliability when a slope related to brightness and an exposure time is calculated at step S200, two reference images are captured for each of pattern 0 and pattern 1. Here, if only a single reference image is used, reliability may be reduced because the brightness value of a pixel becomes 255 even when the actual brightness value of a pixel is greater than 255 (because the maximum brightness value of a pixel in an 8-bit image is 255, the brightness beyond that is also represented as 255). Also, if the brightness value of a pixel is less than 10, because the percentage of noise in a Signal-to-Noise Ratio (SNR) may be equal to or greater than 10%, reliability may be reduced when a slope is calculated. Accordingly, in order to calculate a reliable slope, the exposure time for capturing a reference image is set as described below. First, in order to prevent the brightness value of an object having a high reflection coefficient from being greater than 250, the shutter speed is set fast (that is, a short exposure time is set). Conversely, in order to prevent the brightness value of an object having a low reflection coefficient from being less than 10, the shutter speed is set slow (that is, a long exposure time is set).

In the calculating a slope and categorizing the state of the slope at step S200, a reference image for calculating a reliable slope is selected from among the captured reference images, a slope is calculated for the selected reference image, and the state thereof is categorized. In other words, a slope for pattern 0 and a slope for pattern 1 may be calculated for all the pixels in the reference image according to the processes of the flowchart in FIG. 2A and FIG. 2B.

Figure 2A:
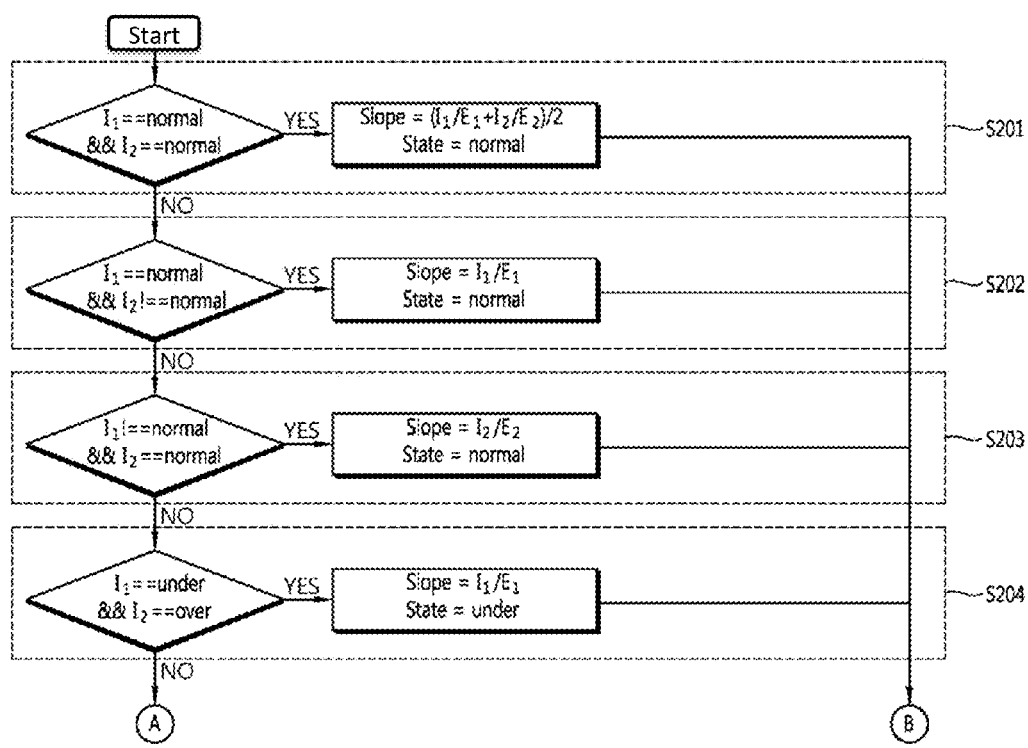
FIG. 2A and FIG. 2B are detailed flowcharts of the process of calculating a slope having high reliability in a captured reference image and of categorizing the state of the slope.
Figure 2B:
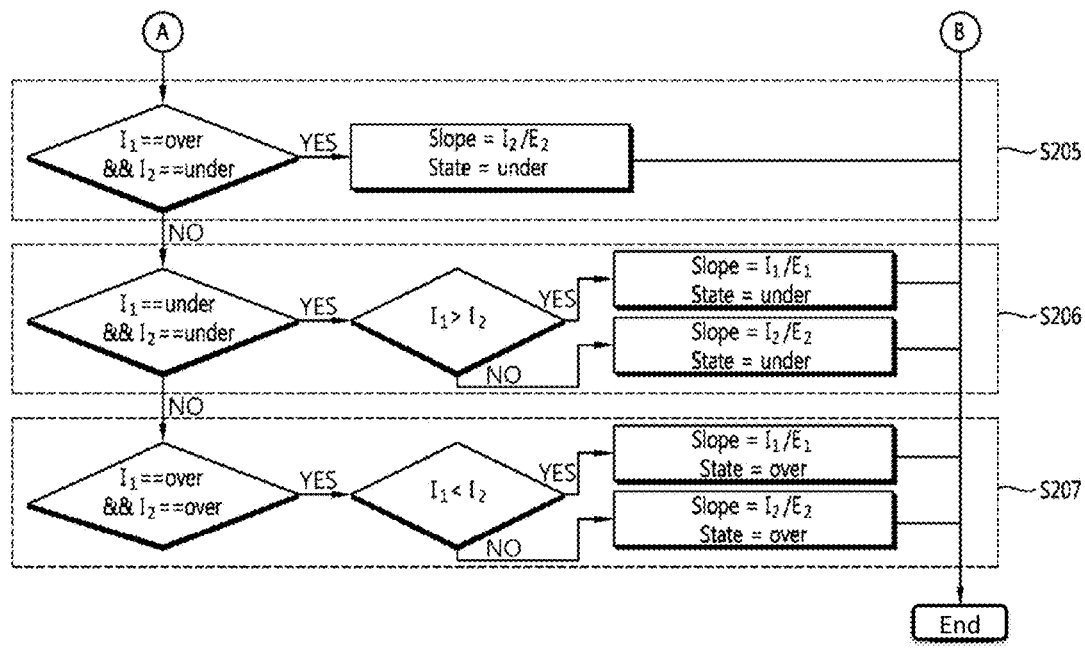

In FIG. 2A and FIG. 2B, $E_1$ means a short exposure time, which is set in a camera when a reference image is captured, and $E_2$ means a long exposure time, which is set in the camera when the reference image is captured. Also, $I_1$ means the brightness value of a pixel in the reference image, which is captured when $E_1$ is set, and $I_2$ means the brightness value of a pixel in the reference image, which is captured when $E_2$ is set. Because there is a linear relationship between I and E, the value of E corresponding to the desired exposure time may be estimated using the slope of I/E. Here, in order to acquire a reliable slope, the state of brightness of a pixel is defined as follows. When I<10, the state is defined as 'under', and when I>250, the state is defined as 'over'. When the state is neither 'under' nor 'over', the state is defined as 'normal'. Depending on the values of $I_1$ and $I_2$, there may be seven cases, as shown in FIG. 2A and FIG. 2B.

S201 is the case in which both the value of $I_1$ and the value of $I_2$ are in the 'normal' state, in which case the mean of the two slopes for the brightness and the exposure time in the 'normal' state is set as the value of a slope.

S202 and S203 are the cases in which either the value of $I_1$ or the value of $I_2$ is in the 'normal' state, in which case the slope for the brightness and the exposure time in the 'normal' state is set as the value of a slope.

S204 and S205 are the cases in which the value of $I_1$ and the value of $I_2$ are respectively in the 'under' and 'over' states or in the 'over' and 'under' states. Here, the value in the 'over' state indicates the case in which the actual brightness value cannot be estimated, and the value in the 'under' state indicates the case in which the percentage of noise is high but the value is more reliable than the value in the 'over' state. Accordingly, the slope for the brightness and the exposure time in the 'under' state is set as the value of a slope.

S206 is the case in which both the value of $I_1$ and the value of $I_2$ are in the 'under' state. Here, because there is less noise as the brightness value of a pixel is greater, the greater brightness value is selected, and the slope for the brightness and the exposure time corresponding to the selected brightness value is set as the value of a slope.

S207 is the case in which both the value of $I_1$ and the value of $I_2$ are in the 'over' state, in which case the slope for the brightness and the exposure time corresponding to the lower brightness value is set as the value of a slope.

Next, in the creating a distribution chart at step S300, using the difference between the slope that is calculated when pattern 1 is projected and the slope that is calculated when pattern 0 is projected, pixels that can be reconstructed and pixels that cannot be reconstructed at each exposure time in the structured light-based camera system are predicted (that is, the number of upper loss pixels and the number of accumulation pixels are calculated), whereby an upper loss pixel distribution chart and an accumulation pixel distribution chart are acquired.

The structured light-based 3D camera may calculate 3D data only when a patterned region, which includes patterns projected from a projection device, is distinguishable from a non-patterned region. Therefore, the difference between the brightness in the patterned region and the brightness in the non-patterned region must be greater than a threshold value $I_{th}$.

Figure 3:
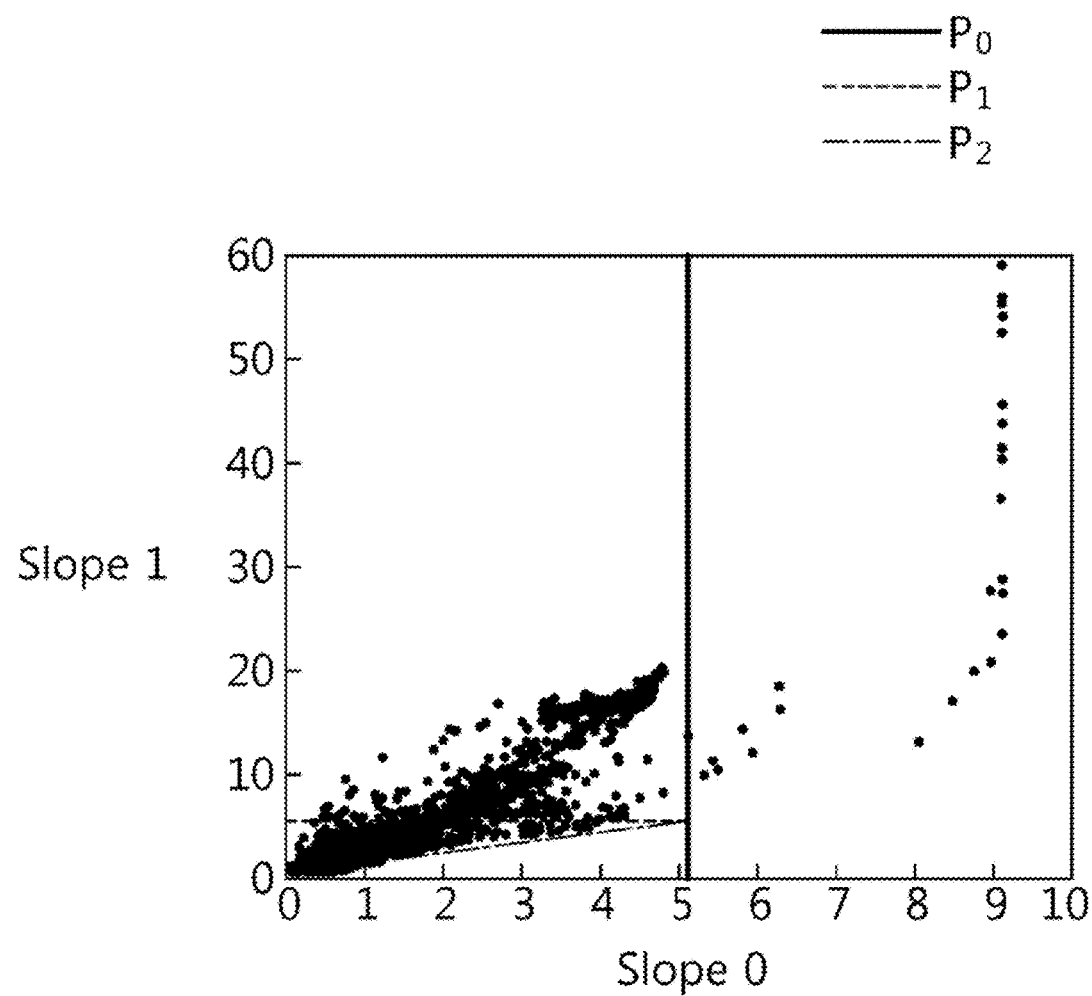
FIG. 3 is an example of a slope1/slope0 distribution chart.

In order to predict pixels that can be reconstructed and pixels that cannot be reconstructed in the structured light-based 3D camera system, the $Slope_1/Slope_0$ distribution chart shown in FIG. 3 is used.

In FIG. 3, $Slope_0$ means the slope that is calculated when pattern 0 is projected, and $Slope_1$ is the slope that is calculated when pattern 1 is projected.

$p_0$ is determined using the following Equation (1):

$$p_0 = (255 - I_{th})/E \qquad (1)$$

$p_1$ is determined using the following Equation (2):

$$p_1 = 255/E \qquad (2)$$

$p_2$ is determined using the following Equation (3):

$$p_2 = (I_{th}/E) + Slope_0 \qquad (3)$$

In the $Slope_1/Slope_0$ distribution chart illustrated in FIG. 3, a pixel at which $Slope_0$ is less than $p_0$ and $Slope_1$ is less than $p_1$ and greater than $p_2$ is estimated as a pixel from which 3D data may be reconstructed. In FIG. 3, a pixel at which $Slope_0$ is greater than $p_0$ and $Slope_1$ is greater than $p_1$ is referred to as an upper loss pixel, and a pixel at which $Slope_1$ is greater than $p_2$ is referred to as an accumulation pixel.

Figure 4A:
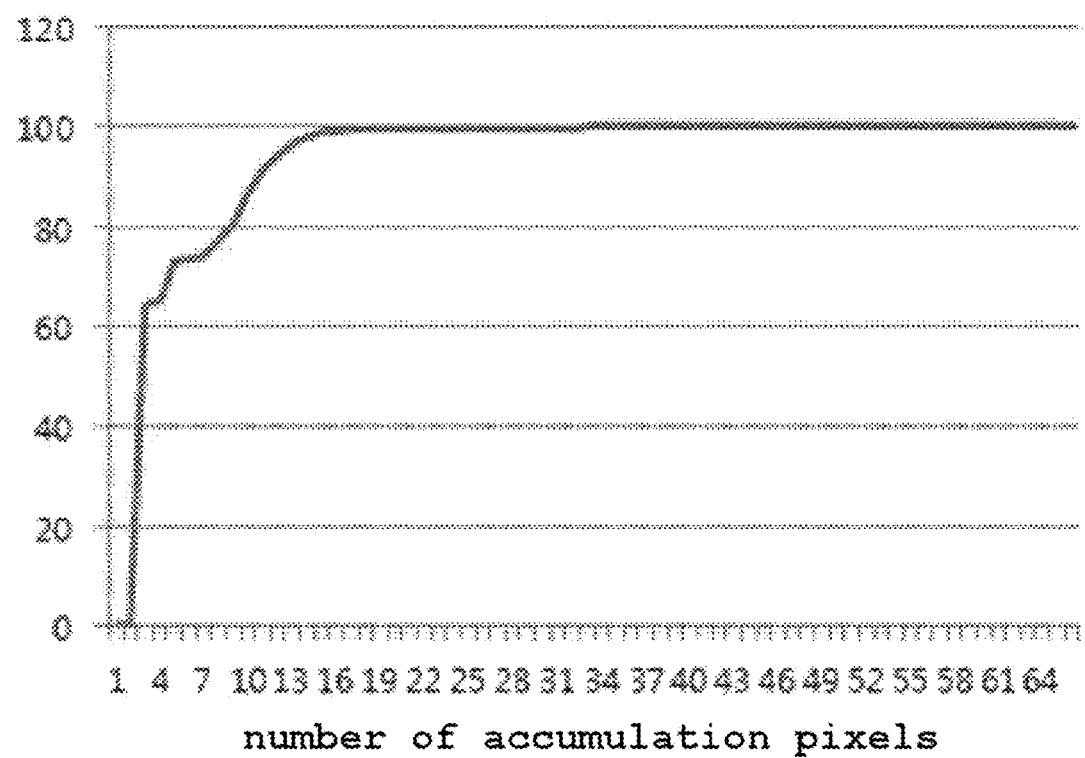
FIG. 4A is an example of an accumulation pixel distribution chart.

When the maximum exposure time allowable in the structured light-based 3D camera system is referred to as $E_M$, the number of pixels that satisfy the condition in which $Slope_1$ is greater than $p_2$, which is calculated after $E_M$ is substituted for E in Equation (3), that is, the number of pixels that satisfy the condition of $Slope_1 > p_2 = (I_{th}/E_M) + Slope_0$, is the maximum number of accumulation pixels. Here, the maximum number of accumulation pixels is referred to as $N_M$. Also, for all exposure times (from $E_1$ to $E_M$) allowable in the structured light-based 3D camera system, the number of accumulation pixels at each exposure time may be calculated using Equation (3). Here, the number of accumulation pixels at each exposure time $E_n$ is referred to as $N_n$. Accordingly, the percentage of accumulation pixels to the maximum number of accumulation pixels is calculated as $$\frac{N_n}{N_M} \times 100,$$

whereby the distribution chart shown in FIG. 4A may be acquired.

Figure 4B:
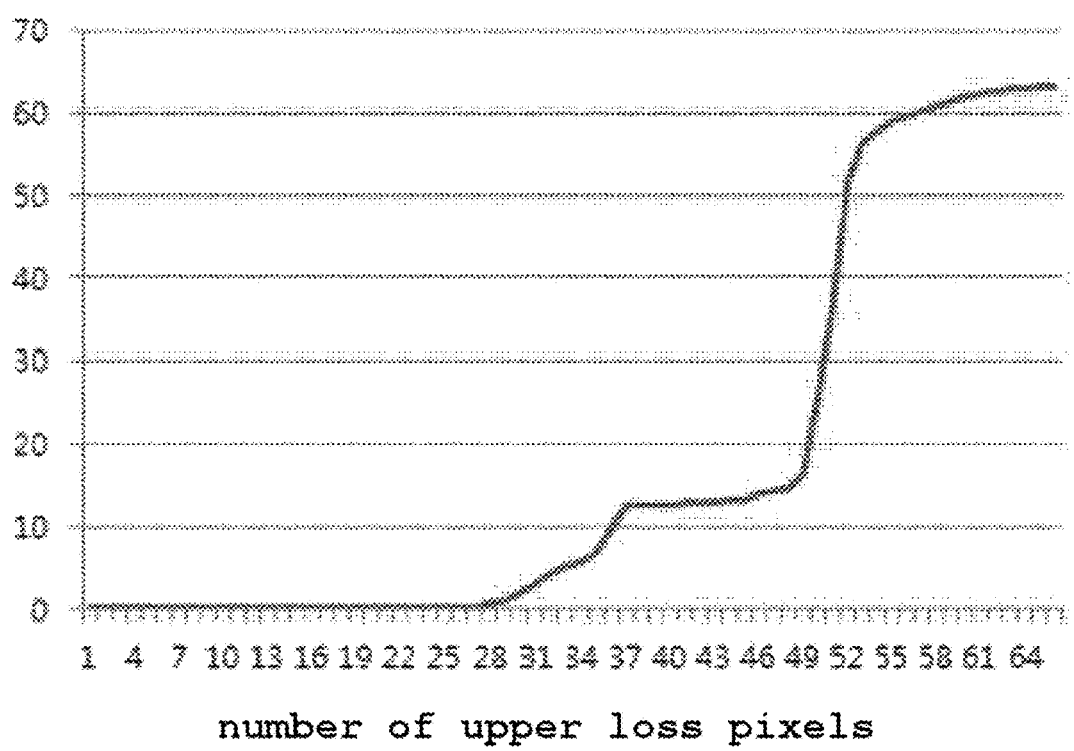
FIG. 4B is an example of an upper loss pixel distribution chart.

Meanwhile, the number of pixels that satisfy the condition of $Slope_0 > (255 - I_{th})/E$ and $Slope_1 > 255/E$ is the number of upper loss pixels. Here, the number of upper loss pixels calculated at each of all exposure times (from $E_1$ to $E_M$) is referred to as $L_n$. Accordingly, the percentage of upper loss pixels to the maximum number of accumulation pixels is calculated as $$\frac{L_n}{N_M} \times 100,$$

whereby the distribution chart shown in FIG. 4B may be acquired.

Here, when the calculated $Slope_1$ is in the 'over' state and the calculated $Slope_0$ is in the 'normal' state, the value of $(Slope_1 - Slope_0)E$ may be greater than the actual value thereof. In this case, because the condition of $(Slope_1 - Slope_0)E > I_{th}$ is satisfied, the corresponding pixel may be assumed to be a pixel that can be reconstructed. However, when $Slope_1$ is in the 'under' state and $Slope_0$ is in the 'over' state, the calculated value of $(Slope_1 - Slope_0)E$ may be less than the actual value thereof, and the value may be less than $I_{th}$. In this case, an erroneous determination that a pixel can be reconstructed may be made. Therefore, the case in which the value of $(Slope_1 - Slope_0)E$ may be less than $I_{th}$ because the value $(Slope_1 - Slope_0)E$ is less than the actual value thereof may be excluded when a pixel that can be reconstructed is predicted. Such a case is as follows.

Figure 5:
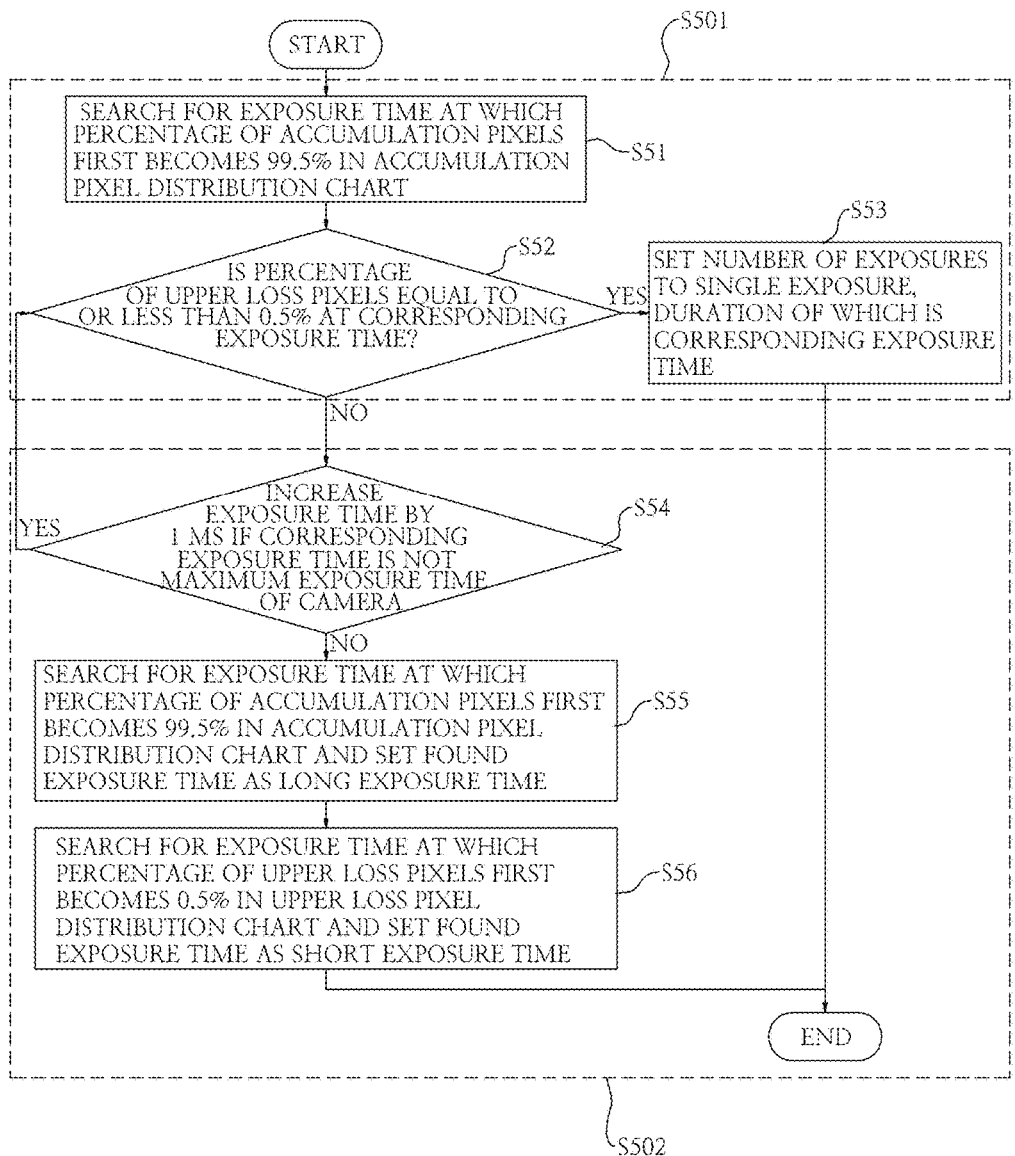
FIG. 5 is a flowchart of the process of determining an exposure time and the number of exposures.

(1) the case in which $Slope_1$ is in the 'over' state and $Slope_0$ is in the 'over' state (2) the case in which $Slope_1$ is in the 'normal' state and $Slope_0$ is in the 'over' state (3) the case in which $Slope_1$ is in the 'under' state and $Slope_0$ is in the 'over' state After the accumulation pixel distribution chart and the upper loss pixel distribution chart, as shown in FIG. 4A and FIG. 4B, are acquired, the optimal exposure time and the number of exposures are determined at step S400, as shown in the flowchart of FIG. 5.

Referring to FIG. 5, S501 is the step in which the number of exposures is set to a single exposure and the optimal duration thereof is the exposure time at which the percentage of pixels lost in the upper and lower regions is less than 1%. Here, the percentage of lower loss pixels is $$1 - \left(\frac{N_n}{N_M} \times 100\right).$$

Specifically, the exposure time at which the percentage of accumulation pixels is 99.5% is searched for in the accumulation pixel distribution chart at step S51, whether the percentage of upper loss pixels is equal to or less than 0.5% is determined at step S52, and whether the number of exposures is set to a single exposure is determined at step S53.

Also, S502 is the step in which the number of exposures is set to two exposures. Here, step S502 includes steps S54, S55, and S56. At step S54, when it has been determined at step S52 that the percentage of upper loss pixels is greater than 0.5%, whether the exposure time found at step S51 is the maximum exposure time of the camera is determined. At step S55, the exposure time at which the percentage of accumulation pixels first becomes 99.5% is searched for in the accumulation pixel distribution chart, and the found exposure time is set as a long exposure time. Also, at step S56, the exposure time at which the percentage of upper loss pixels is equal to or less than 0.5% is searched for, and the found exposure time and the long exposure time are set as the duration of the two exposures. Specifically, if the exposure time found at step S51 is not the maximum exposure time of the camera, the exposure time is increased by 1 ms and the process returns to step S52. If the exposure time found at step S51 is the maximum exposure time of the camera, the exposure time found at step S51 and the newly found exposure time at step S56 are set as the exposure times of the two exposures.

In the flowchart of FIG. 5, if 99% of pixels can be reconstructed through a single exposure, the number of exposures is set to a single exposure, but if not, the number of exposures is set to two exposures in order to enable an object having a low reflection coefficient to be reconstructed at a long exposure time and an object having a high reflection coefficient to be reconstructed at a short exposure time, whereby 99% of pixels can be reconstructed.

3D Camera System Based on Structured Light

As an embodiment of the present invention, a structured light-based 3D camera system 10 that uses the above-described method for determining the optimal number of exposures and the duration thereof may be provided.

Figure 6:
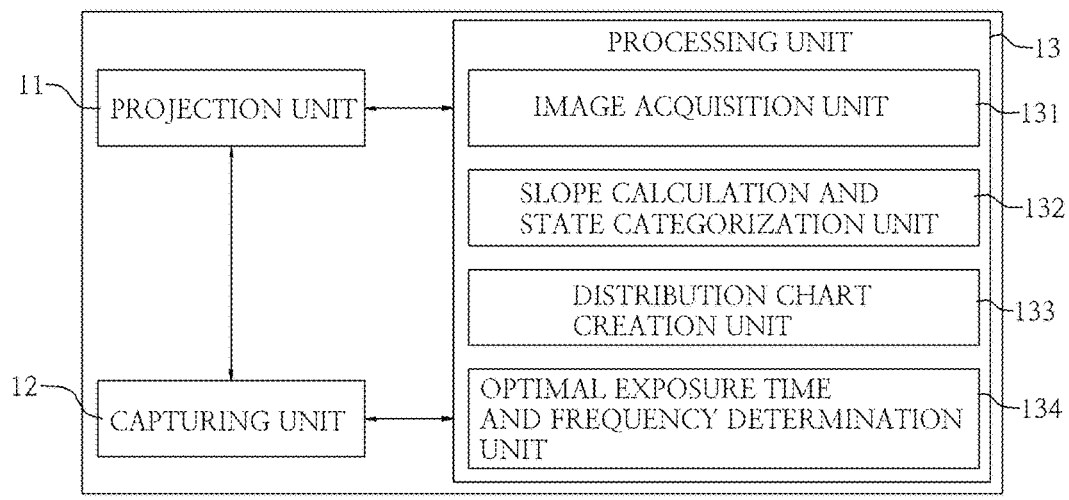
FIG. 6 is a schematic block diagram of a structured light-based 3D camera system in which a method for determining the optimal exposure according to the present invention is used.

Referring to FIG. 6, the structured light-based 3D camera system 10 includes a projection unit 11, a capturing unit 12, and a processing unit 13.

The projection unit 11 may project various patterns onto a target object.

The capturing unit 12 may capture an image that includes the pattern projected from the projection unit 11.

The processing unit 13 includes an image acquisition unit 131, a slope calculation and state categorization unit 132, a distribution chart creation unit 133 and an optimal exposure time and frequency determination unit 134.

The image acquisition unit 131 may acquire an image onto which patterns, such as pattern 0 (an all-black pattern), pattern 1 (an all-white pattern) or the like, are projected.

The slope calculation and state categorization unit 132 calculates a slope related to brightness and an exposure time for all the pixels in the reference image, onto which pattern 0 and pattern 1 are projected, and categorizes the state of the slope, the reference image being acquired from the image acquisition unit.

The distribution chart creation unit 133 may acquire a distribution chart by predicting pixels that can be reconstructed and pixels that cannot be reconstructed (that is, by calculating the number of upper loss pixels and the number of accumulation pixels) at each exposure time using the difference between the slope calculated when pattern 1 is projected and the slope calculated when pattern 0 is projected.

The optimal exposure time and frequency determination unit 134 may determine the optimal exposure time and the optimal number of exposures using the above-described method that uses the upper loss pixel distribution chart and the accumulation pixel distribution chart.

Experimental Example

Figure 7:
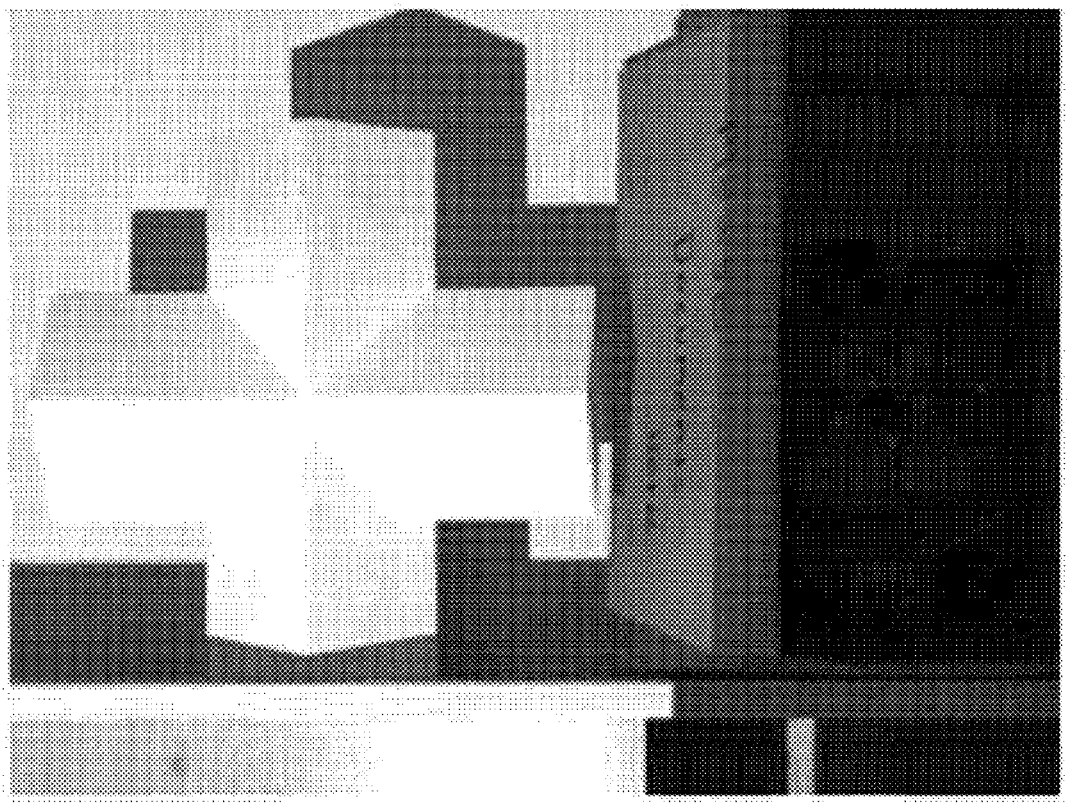
FIG. 7 shows an experimental environment for comparing the case in which a single exposure is set according to an existing method for determining the optimal exposure with the case in which two exposures are set according to the method proposed by the present invention.

FIG. 7 shows an experimental example for comparing the case in which a single exposure is set according to an existing method for determining the optimal exposure with the case in which two exposures are set according to the method proposed by the present invention. This example is configured to include an object having a high reflection coefficient (the white object at the left side) and an object having a low reflection coefficient (the black object in the box).

FIG. 8 is a table that shows the exposure time and the number of reconstructed pixels when the scene of FIG. 7 is captured using a structured light-based 3D camera system. Here, the number of exposures is set to a single exposure, the duration thereof is set to a range from 1 ms to 100 ms, having an interval of 3 ms, and the number of pixels that are actually reconstructed into 3D data is measured. When the exposure duration is set to 28 ms, the maximum number of pixels are reconstructed, in which case the number of reconstructed pixels is 237,536.

Figure 9A:
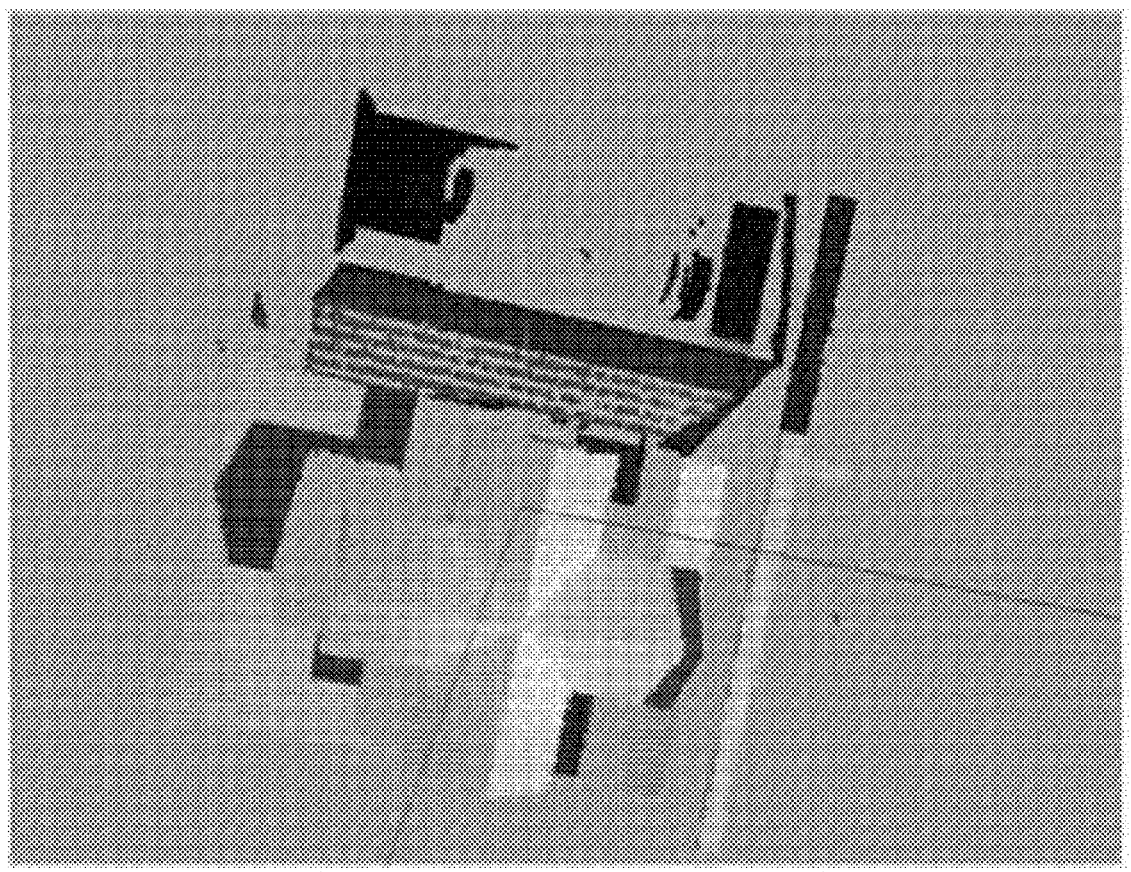
FIGS. 9A, 9B and 9C show the result of reconstruction of 3D data when the scene of FIG. 7 is captured using a structured light-based 3D camera system.
Figure 9B:
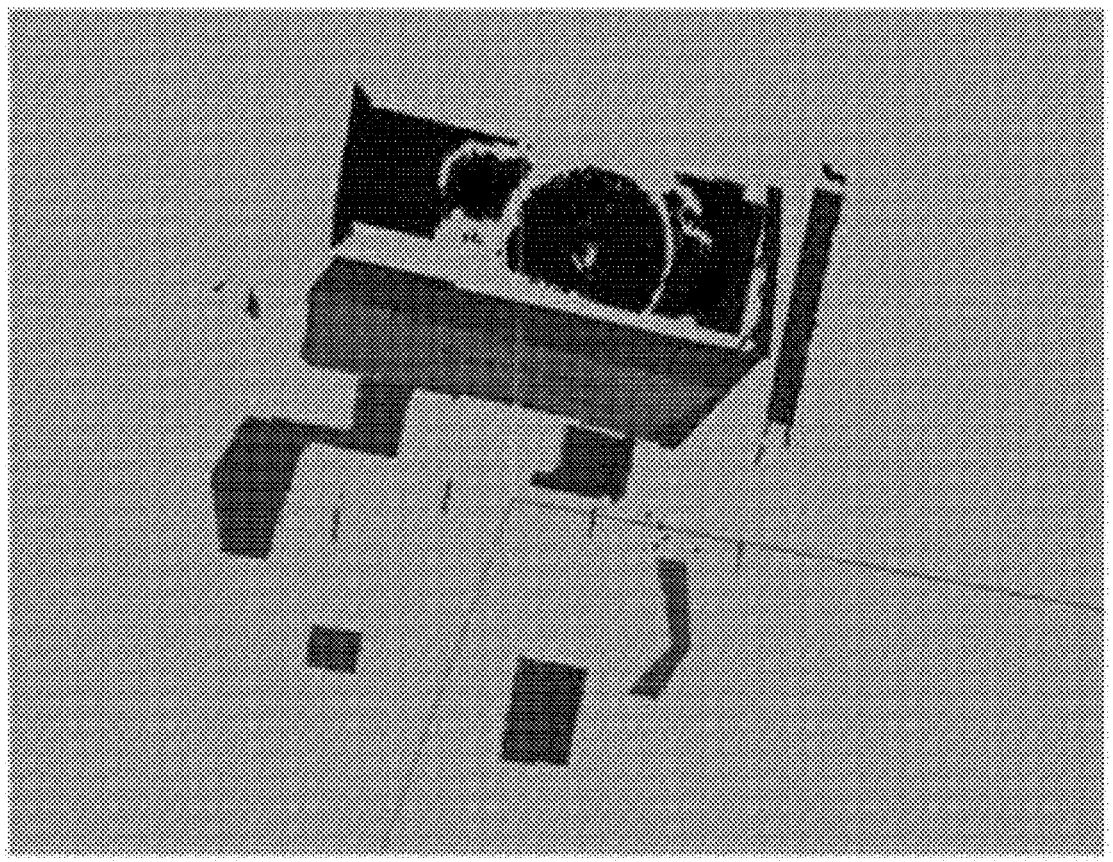
Figure 9C:
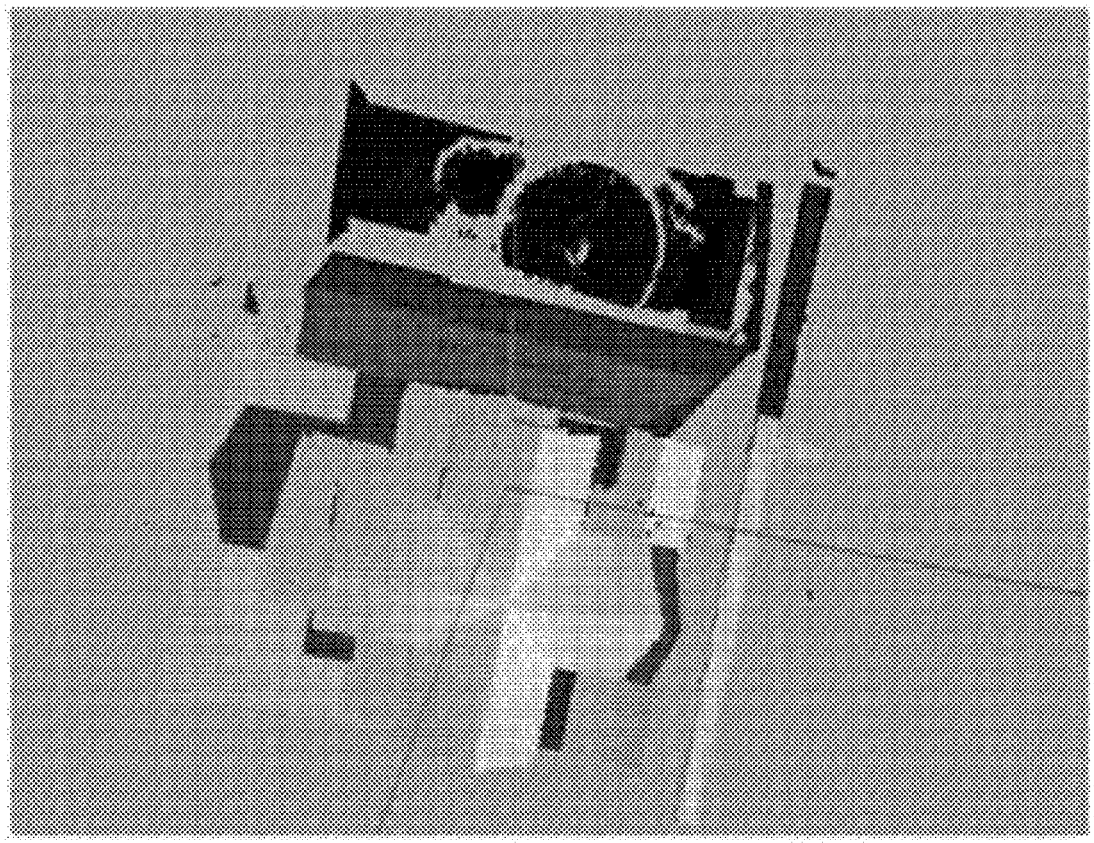

FIGS. 9A, 9B and 9C show the result of reconstruction of 3D data when the scene of FIG. 7 is captured using a structured light-based 3D camera system. When the method proposed in the present invention is applied to the scene of FIG. 7, the necessary number of exposures is set to two exposures, and the durations thereof are set to 3 ms and 84 ms, respectively. FIG. 9A is the result of capturing an image when the exposure time is set to 3 ms, in which case only a region that has a high reflection coefficient is reconstructed. FIG. 9B is the result of capturing an image when the exposure time is set to 84 ms, in which case only a region that has a low reflection coefficient is reconstructed. FIG. 9C is the result of a combination of the reconstructed pixels of FIG. 9A and the reconstructed pixels of FIG. 9B, with a total of 251,900 reconstructed pixels. Consequently, it is confirmed that the percentage of reconstructed pixels is increased by 6% when the number of exposures is set to two exposures compared to when the number of exposures is set to one exposure.

In a general 3D camera system based on structured light, it is difficult to accurately detect patterns when the patterns are projected onto an object having a reflection coefficient that is too high or too low. This problem may be solved by adjusting the number of exposures and/or the exposure time of a camera, whereby reliable 3D data may be reconstructed. Therefore, the structured light-based 3D camera system of the present invention may more accurately reconstruct 3D data of an object having a low or high reflection coefficient in industrial fields.

Also, the structured light-based 3D camera system of the present invention sets two exposures having the optimal duration when it is difficult to reconstruct 3D data only through a single exposure in an environment in which an object having a low reflection coefficient and an object having a high reflection coefficient are both present, whereby reliability may be improved and the extent to which 3D data are reconstructed may be increased.

In the case of existing structured light-based 3D camera systems, it is difficult for laypersons to adjust the aperture of the camera because the adjustment thereof is not simple. However, in the structured light-based 3D camera system of the present invention, because the exposure time of the camera is automatically determined, laypersons may easily use the camera.

The above embodiments have been described for illustrative purposes and should not be construed as limiting the scope of the present invention, which is defined by the accompanying claims. Accordingly, other embodiments may fall into the range of technical spirit defined by the accompanying claims. For example, those skilled in the art may make various modifications without departing from the scope of the present invention. Additionally, because some of the above-described steps are independent from the order in which the steps are performed, they may be performed in a different order from the order in the above description. Also, some of the steps may be omitted or other steps may be further included.

What is claimed is:

1. A method for determining an exposure parameter for a structured light-based 3D camera system, the method comprising:
   capturing a first reference image and a second reference image, the first reference image including a reflection of a first pattern from a target object and the second reference image including a refection of a second pattern from the target object;
   calculating a pixel distribution from the first reference image and the second reference image; and
   determining the exposure parameter using the pixel distribution,
   wherein the calculating the pixel distribution includes calculating a plurality of slopes related to a brightness and an exposure time for selected pixels of the first reference image and the second reference image, and categorizing the plurality of slopes.

2. The method of claim 1, wherein the calculating the pixel distribution includes calculating an upper loss pixel distribution and an accumulation pixel distribution from a number of upper loss pixels and a number of accumulation pixels.

3. The method of claim 1, wherein the exposure parameter includes at least one of an exposure time and a number of exposures.

4. The method of claim 1, wherein each of the first pattern and the second pattern includes at least one of an all-black pattern and an all-white pattern.

5. The method of claim 2, wherein the calculating the upper loss pixel distribution and the accumulation pixel distribution includes excluding states in which a brightness value of a pixel associated with the first reference image and a brightness value of a pixel associated with the second reference image are less than a predetermined threshold brightness value.

6. The method of claim 1, wherein the first pattern and the second pattern are the same.

7. The method of claim 1, wherein the first pattern and the second pattern are different.

8. A structured light-based 3D camera system, comprising:
a projection unit for projecting a first pattern and a second pattern onto a target object;
a capturing unit for capturing a first reference image and a second reference image, the first reference image including a reflection of the first pattern from the target object and the second reference image including a reflection of the second pattern from the target object; and
a processing unit for calculating a pixel distribution from the first reference image and the second reference image, and determining an exposure parameter for the structured light-based 3D camera system using the pixel distribution,
wherein the processing unit calculates the pixel distribution by calculating a plurality of slopes related to a brightness and an exposure time for selected pixels of the first reference image and the second reference image, and categorizing the plurality of slopes.

9. The structured light-based 3D camera system of claim 8, wherein each of the first pattern and the second pattern includes at least one of an all-black pattern and an all-white pattern.

10. The structured light-based 3D camera system of claim 8, wherein the exposure parameter includes at least one of an exposure time and a number of exposures.

11. The structured light-based 3D camera system of claim 8, wherein the processing unit calculates the pixel distribution by calculating an upper loss pixel distribution and an accumulation pixel distribution from a number of upper loss pixels and a number of accumulation pixels.

12. The structured light-based 3D camera system of claim 11, wherein the calculating the upper loss pixel distribution and the accumulation pixel distribution comprise excluding states in which a brightness value of a pixel associated with the first reference image and a brightness value of a pixel associated with the second reference image are less than a predetermined threshold brightness value.

13. The structured light-based 3D camera system of claim 8, wherein the first pattern and the second pattern are the same.

14. The structured light-based 3D camera system of claim 8, wherein the first pattern and the second pattern are different.

15. A method for determining an exposure parameter for a structured light-based 3D camera system, the method comprising:
capturing a first reference image and a second reference image, the first reference image including a reflection of a first pattern from a target object and the second reference image including a refection of a second pattern from the target object;
calculating a pixel distribution from the first reference image and the second reference image; and
determining the exposure parameter using the pixel distribution,
wherein the calculating the pixel distribution includes calculating an upper loss pixel distribution and an accumulation pixel distribution from a number of upper loss pixels and a number of accumulation pixels.

16. The method of claim 15, wherein the exposure parameter includes at least one of an exposure time and a number of exposures.

17. The method of claim 15, wherein each of the first pattern and the second pattern includes at least one of an all-black pattern and an all-white pattern.

18. The method of claim 15, wherein the first pattern and the second pattern are the same.

19. The method of claim 15, wherein the first pattern and the second pattern are different.

20. A structured light-based 3D camera system, comprising:
a projection unit for projecting a first pattern and a second pattern onto a target object;
a capturing unit for capturing a first reference image and a second reference image, the first reference image including a reflection of the first pattern from the target object and the second reference image including a reflection of the second pattern from the target object; and
a processing unit for calculating a pixel distribution from the first reference image and the second reference image, and determining an exposure parameter for the structured light-based 3D camera system using the pixel distribution,
wherein the processing unit calculates the pixel distribution by calculating an upper loss pixel distribution and an accumulation pixel distribution from a number of upper loss pixels and a number of accumulation pixels.

21. The structured light-based 3D camera system of claim 20, wherein each of the first pattern and the second pattern includes at least one of an all-black pattern and an all-white pattern.

22. The structured light-based 3D camera system of claim 20, wherein the exposure parameter includes at least one of an exposure time and a number of exposures.

23. The structured light-based 3D camera system of claim 20, wherein the first pattern and the second pattern are the same.

24. The structured light-based 3D camera system of claim 20, wherein the first pattern and the second pattern are different.

25. A method for determining an exposure parameter for a structured light-based 3D camera system, the method comprising:
capturing a first reference image and a second reference image, the first reference image including a reflection of a first pattern from a target object and the second reference image including a refection of a second pattern from the target object;

calculating a pixel distribution from the first reference image and the second reference image; and determining the exposure parameter using the pixel distribution, wherein the calculating the pixel distribution includes calculating an upper loss pixel distribution and an accumulation pixel distribution from a number of upper loss pixels and a number of accumulation pixels, and wherein the calculating the upper loss pixel distribution and the accumulation pixel distribution includes excluding states in which a brightness value of a pixel associated with the first reference image and a brightness value of a pixel associated with the second reference image are less than a predetermined threshold brightness value.

26. The method of claim 25, wherein the exposure parameter includes at least one of an exposure time and a number of exposures.

27. The method of claim 25, wherein each of the first pattern and the second pattern includes at least one of an all-black pattern and an all-white pattern.

28. The method of claim 25, wherein the first pattern and the second pattern are the same.

29. The method of claim 25, wherein the first pattern and the second pattern are different.

30. A structured light-based 3D camera system, comprising:

a projection unit for projecting a first pattern and a second pattern onto a target object;

a capturing unit for capturing a first reference image and a second reference image, the first reference image including a reflection of the first pattern from the target object and the second reference image including a reflection of the second pattern from the target object; and a processing unit for calculating a pixel distribution from the first reference image and the second reference image, and determining an exposure parameter for the structured light-based 3D camera system using the pixel distribution, wherein the processing unit calculates the pixel distribution by calculating an upper loss pixel distribution and an accumulation pixel distribution from a number of upper loss pixels and a number of accumulation pixels, and wherein the calculating the upper loss pixel distribution and the accumulation pixel distribution comprise excluding states in which a brightness value of a pixel associated with the first reference image and a brightness value of a pixel associated with the second reference image are less than a predetermined threshold brightness value.

31. The structured light-based 3D camera system of claim 30, wherein each of the first pattern and the second pattern includes at least one of an all-black pattern and an all-white pattern.

32. The structured light-based 3D camera system of claim 30, wherein the exposure parameter includes at least one of an exposure time and a number of exposures.

33. The structured light-based 3D camera system of claim 30, wherein the first pattern and the second pattern are the same.

34. The structured light-based 3D camera system of claim 30, wherein the first pattern and the second pattern are different.

* * * * *